(12) United States Patent  
Shimazaki

(10) Patent No.: US 8,552,840 B2  
(45) Date of Patent: Oct. 8, 2013

(54) PRODUCT MANAGING APPARATUS AND CONTROL METHOD

(75) Inventor: Takeshi Shimazaki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 468 days.

(21) Appl. No.: 12/859,515

(22) Filed: Aug. 19, 2010

(65) Prior Publication Data

US 2011/0050401 A1 Mar. 3, 2011

(30) Foreign Application Priority Data

Sep. 1, 2009 (JP) ................. 2009-201874

(51) Int. Cl.
*H04Q 5/22* (2006.01)
*G08B 13/14* (2006.01)

(52) U.S. Cl.
USPC ........................ 340/10.42; 340/572; 340/10

(58) Field of Classification Search
USPC ................. 340/10, 572, 10.42, 10.5
See application file for complete search history.

(56) References Cited

U.S. PATENT DOCUMENTS

| | | | | |
|---|---|---|---|---|
| 7,952,481 B2 * | 5/2011 | Shoarinejad et al. | ...... | 340/572.1 |
| 7,954,707 B2 * | 6/2011 | Shimizu et al. | ........... | 235/380 |
| 2006/0238370 A1 * | 10/2006 | Park et al. | .......... | 340/825.49 |
| 2009/0090773 A1 * | 4/2009 | Tokunaga | .......... | 235/383 |
| 2009/0289775 A1 * | 11/2009 | Kubota et al. | ............ | 340/10.6 |

FOREIGN PATENT DOCUMENTS

| | | | |
|---|---|---|---|
| JP | 2001-078575 | | 3/2001 |
| JP | 2001078575 A | * | 3/2001 |
| JP | 2001-323700 | | 11/2001 |
| JP | 2004-118453 | | 4/2004 |
| JP | 2007-323262 | | 12/2007 |
| JP | 2009-086912 | | 4/2009 |
| JP | 2009-120301 | | 6/2009 |
| JP | 2009120301 A | * | 6/2009 |

OTHER PUBLICATIONS

Japanese Office Action for Patent Application No. 2009-201874 mailed on Jul. 12, 2011.

* cited by examiner

*Primary Examiner* — George Bugg
*Assistant Examiner* — Munear Akki
(74) *Attorney, Agent, or Firm* — Turocy & Watson, LLP

(57) ABSTRACT

According to one embodiment, a product managing apparatus includes a radio unit, an instruction receiving unit, an area-password storing unit, and a password updating unit. The radio unit performs radio communication with an RFID tag that is attached to a product and can store an identification code of the product and a password. The instruction receiving unit receives an instruction for moving the product from a first area to a second area. The area-password storing unit stores a password corresponding to the second area. When the instruction receiving unit receives the instruction for moving the product from the first area to the second area, the password updating unit causes the radio unit to operate and writes, in the RFID tag attached to the product, the password corresponding to the second area.

7 Claims, 7 Drawing Sheets

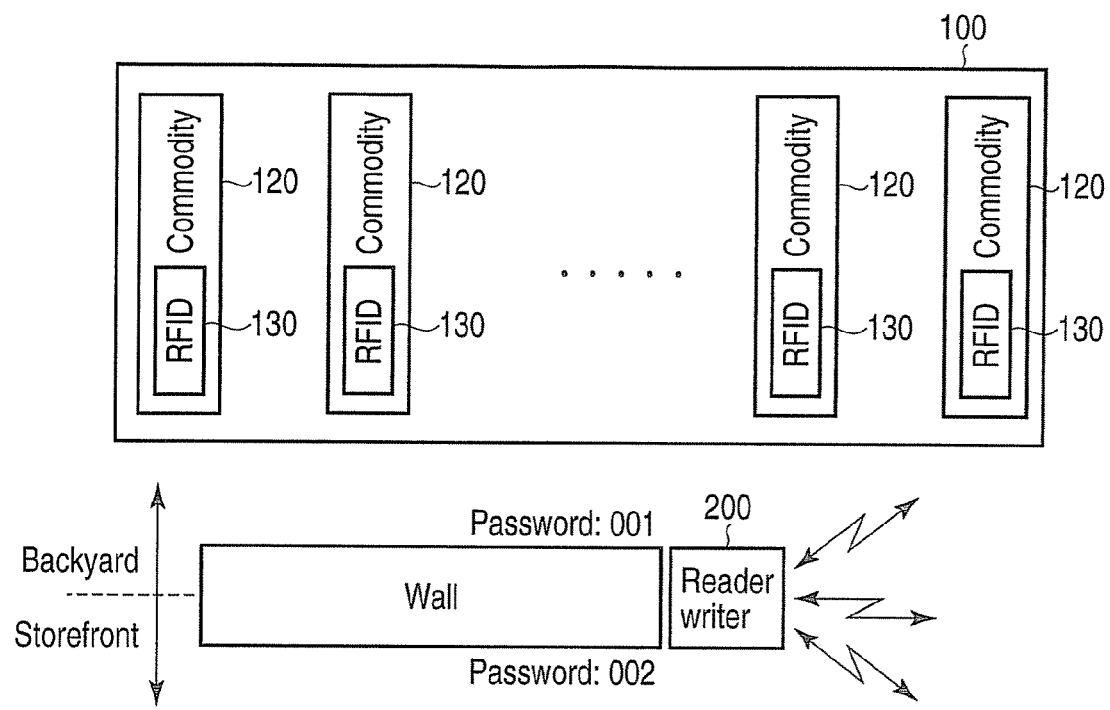
F I G. 1
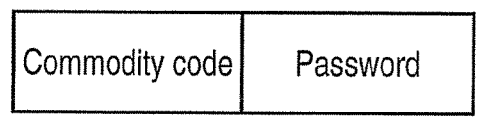
F I G. 2

| | |
|---|---|
| Backyard | 001 |
| Storefront | 002 |

| Commodity code | Commodity name | Password |
|---|---|---|
| www | WWW | 001 |
| xxx | XXX | 002 |
| yyy | YYY | 002 |
| zzz | ZZZ | 001 |

PRODUCT MANAGING APPARATUS AND CONTROL METHOD

CROSS-REFERENCE TO RELATED APPLICATIONS

This application is based upon and claims the benefit of priority from Japanese Patent Application No. 2009-201874, filed on Sep. 1, 2009; the entire contents of which are incorporated herein by reference.

FIELD

Embodiments described herein relate generally to a product managing apparatus configured to manage locations of products such as commodities by reading information of RFID (Radio Frequency Identification) tags respectively attached to the products and a control method for the product managing apparatus.

BACKGROUND

In recent years, a product managing system is developed that manages locations of management target products by attaching RFID tags to the products and reading information of the tags with a tag reader. The tag reader can read information of plural RFID tags substantially simultaneously in a non-contact manner. Therefore, human burdens required for inventory work can be greatly reduced. There is also an advantage that time required for work can be greatly reduced.

The tag reader can read information from RFID tags present in a reaching area of a radio wave radiated from an antenna. In particular, when a UHF band is used for the radio wave, a reading range of RFID tags by a reader writer is widened. Therefore, even if it is attempted to cause the reader writer to read information of RFID tags of only products placed in a designated area such as a specific shelf or a backyard, if the radio wave is radiated beyond the designated area, the reader writer simultaneously reads information of RFID tags of products placed on the outside of the designated area. In this case, the products placed on the outside of the designated area are also managed as being present in the designated area. For example, the reader writer further reads information of RFID tags attached to commodities arranged on a commodity shelf adjacent to the specific shelf by mistake or, whereas the reader writer should read information of RFID tags attached to commodities arranged in the backyard, the reader writer also read information of RFID tags attached to commodities arranged in a storefront by mistake.

Therefore, in the past, there is known a product managing apparatus including: a position-information input unit configured to input position information for individually specifying plural areas in which products are arranged; a position-information storing unit configured to overwrite, every time position information is input by the position-information input unit, position information stored therein with the input position information and store the input position information; a tag-basic-position storing unit configured to store, for each of RFID tags, in association with each other, identification information peculiar to the RFID tag and position information of an area where a product attached with the RFID tag is arranged; a position determining unit configured to determine whether position information stored by the tag-basic-position storing unit in association with identification information read from an RFID tag by a tag reader coincides with the position information stored by the position-information storing unit; and a reporting unit configured to report, for each of RFID tags from which identification information is read by the tag reader, a determination result by the position determining unit. The product managing apparatus can identify information of RFID tags of products placed in a designated area and information of RFID tags of products placed on the outside of the designated area.

However, the product managing apparatus in the past is complicate because the product managing apparatus has to include in advance, as a unit for storing master information, the tag-basic-position storing unit configured to store, for each of RFID tags, identification information peculiar to the RFID tag and position information of an area where a product attached with the RFID tag is arranged in association with each other.

In view of such circumstances, there is a demand for a product managing apparatus that can manage, even if specific master information is not prepared in advance, the stock of only commodities arranged in a backyard or a storefront or commodities arranged on specific shelves in the backyard and the storefront.

BRIEF DESCRIPTION OF THE DRAWINGS

FIG. 1 is a conceptual diagram of a commodity managing system according to a first embodiment;

FIG. 2 is a diagram of a format of data stored in a memory of an RFID tag in the commodity managing system;

DETAILED DESCRIPTION

Figures 3, 4, 5:
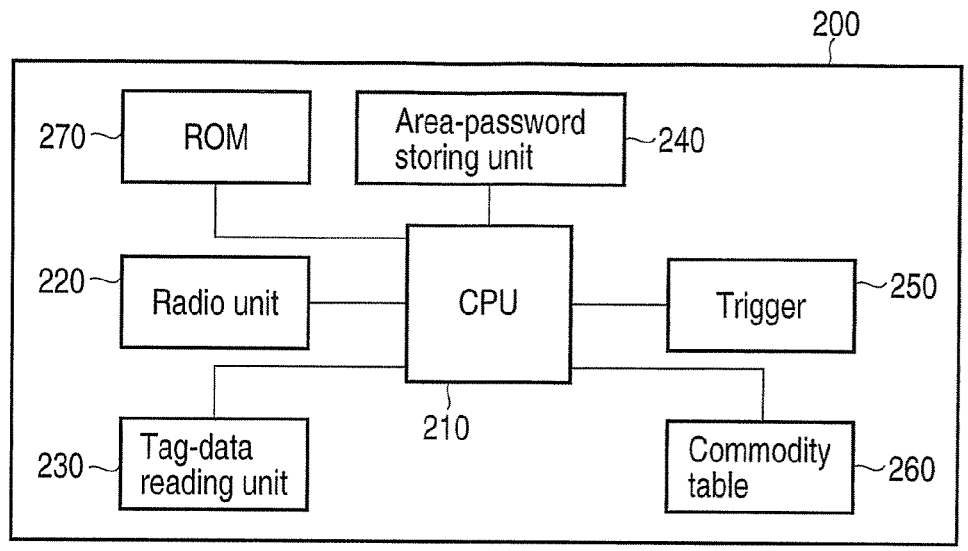
FIG. 3 is a block diagram of the configuration of a reader writer of the commodity managing system.
FIG. 4 is a conceptual diagram of an area-password setting unit of the commodity managing system.
FIG. 5 is a conceptual diagram of a database in a commodity table of the commodity managing system.

In general, according to one embodiment, a product managing apparatus includes: a radio unit, an instruction receiving unit, an area-password storing unit, and a password updating unit. The radio unit performs radio communication with an RFID tag that is attached to a product and can store an identification code of the product and a password. The instruction receiving unit receives an instruction for moving the product from a first area to a second area. The area-password storing unit stores a password corresponding to the second area. When the instruction receiving unit receives the instruction for moving the product from the first area to the second area, the password updating unit causes the radio unit to operate and writes, in the RFID tag attached to the product, the password corresponding to the second area stored in the area-password storing unit.

First and second embodiments are explained with reference to the accompanying drawings. In the explanation, components common to all figures are denoted by common reference numerals and signs.

First Embodiment

In this embodiment, a commodity managing system constructed in a store in which commodities as management target products are respectively sold with RFID tags attached thereto is explained with an example. Specifically, a commodity delivery job or a job opposite to the commodity delivery job in a retail store is explained with an example.

A diagram of a commodity managing system according to the first embodiment is explained below with reference to FIG. 1. In the commodity managing system, a password corresponding to an area where an RFID tag attached to a commodity is located is set for the RFID tag. As a product managing apparatus configured to set, for the RFID tag, the password corresponding to the area, in this embodiment, a reader writer is explained as an example.

As shown in the figure, plural commodities 120 are stored on a commodity shelf 100 arranged in a backyard. RFID tags 130 are respectively attached to the commodities 120. It is assumed that the same password is written in the RFID tags 130. Specifically, each of the RFID tags 130 includes an internal antenna and an IC chip not shown in the figure. A memory and a control circuit and the like necessary for communication are mounted on the IC chip. In the memory, besides an ID peculiar to the RFID tag 130, as shown in FIG. 2, a peculiar identification code of the commodity 120 to which the RFID tag 130 is attached (hereinafter referred to as commodity code) and a peculiar password (a password on the backyard side) are written. A password written in the RFID tag 130 arranged on the backyard side is represented as '001'.

A storefront is present on the opposite side of the backyard across a wall. A password of the RFID tag 130 attached to the commodity 120 arranged in the storefront is represented as '002'.

A reader writer 200 is arranged on the wall that partitions the backyard and the storefront. When the commodity 120 arranged on the backyard side is delivered to the storefront side, a password of the RFID tag 130 attached to the commodity 120 is changed by the reader writer 200.

The reader writer 200 is, for example, a handy-type reader writer. The reader writer 200 is hung on a hooking member provided on the wall that partitions the backyard and the storefront. When the reader writer 200 is hung on the wall in this way, a communication range of the reader writer 200 is adjusted to cover all moving paths from the backyard to the storefront and not to reach commodities displayed on the commodity shelf 100 and the storefront. The reader writer 200 has a function of writing passwords corresponding to areas in the respective RFID tags 130. In other words, the reader writer 200 has not only a function of receiving data transmitted from the RFID tag 130 and reading a commodity code and a password from the tag data as explained above but also a function of writing a desired password in the REID tag 130.

Reader Writer 200

The internal configuration of the reader writer 200 according to this embodiment is explained below with reference to FIG. 3. As shown in the figure, the reader writer 200 includes, besides a CPU (Central Processing Unit) 210 configured to centrally control the following components, a radio unit 220, a tag-data reading unit 230, a commodity table 260 (the product table), and a ROM (Read only memory) 270, a trigger 250 and an area-password storing unit 240 (the area-password storing unit). A control circuit is formed by connecting, with a bus line, the CPU 210, the radio unit 220, the tag-data reading unit 230, the area-password storing unit 240, the trigger 250, the commodity table 260, and the ROM 270 configured to store fixed data such as a computer program for controlling the CPU 210. The CPU 210 functions as the password updating unit in this embodiment.

The radio unit 220 performs radio communication with the RFID tag 130 and captures tag data stored in the memory of the RFID tag 130.

The tag-data reading unit 230 reads a commodity code and a password from the tag data supplied from the radio unit 220. The tag-data reading unit 230 stores the read commodity code and password in a work memory.

The area-password storing unit 240 stores, as shown in FIG. 4, the password "001" set for the commodity 120 placed in the backyard and the password "002" set for the commodity 120 placed in the storefront.

The trigger 250 receives an instruction for the start of a commodity delivery job or a job opposite to the commodity delivery job (the instruction receiving unit). Then, the trigger 250 outputs, to the CPU 210, a signal for informing that the commodity 120 is delivered from the backyard to the storefront or a signal for informing that the commodity 120 is returned from the storefront to the backyard.

The commodity table 260 stores, as shown in FIG. 5, commodity codes of commodities arranged in the storefront and the backyard and commodity names and passwords associated with the commodity codes. When the commodities corresponding to the passwords are moved from the backyard to the storefront or moved from the storefront to the backyard, the passwords are updated to values at a moving destination area of the commodities.

Operation by the Reader Writer 200

Figure 6:
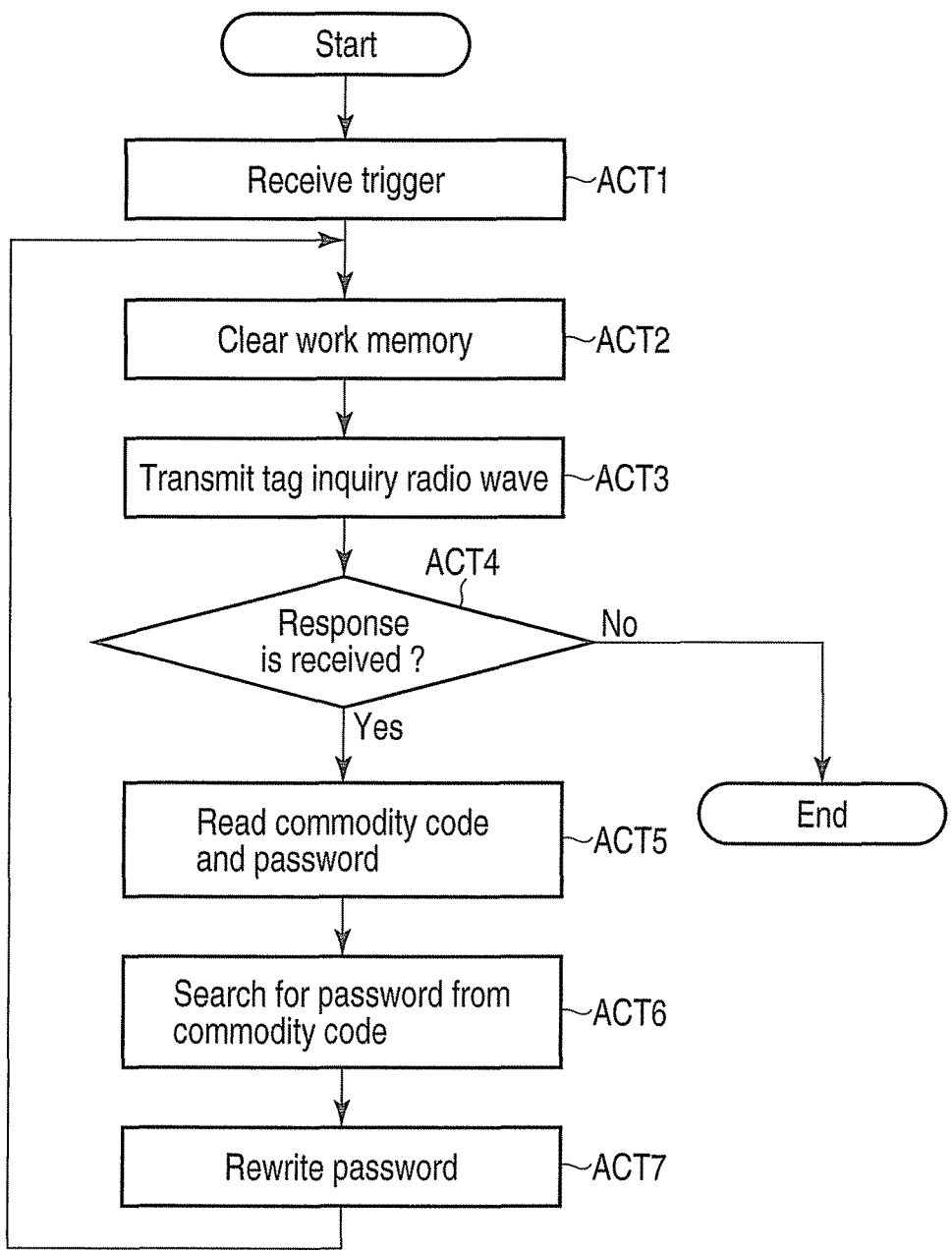
FIG. 6 is a flowchart for explaining a procedure of commodity delivery processing executed by a CPU of the reader writer in the commodity managing system.

In a commodity delivery job for moving the commodity 120 arranged on the backyard side to the storefront, the CPU 210 executes processing of a procedure shown in a flowchart of FIG. 6. This processing is realized by the control program stored in the ROM 270.

First, the CPU 210 of the reader writer 200 waits for a signal for informing the start of the commodity delivery job from the trigger 250 (ACT 1). When the CPU 210 receives the signal for informing the start of the commodity delivery job from the trigger 250 in ACT 1, the CPU 210 clears the work memory included in the commodity-code reading unit 230 (ACT 2). The CPU 210 causes the radio unit 220 to radiate an inquiry radio wave for an RFID tag (ACT 3). Consequently, when the commodity 120 is being moved from the backyard side to the storefront side and the RFID tag 130 is present in a communication area of the inquiry radio wave, the RFID tag 130 is activated and responds to the inquiry. Specifically, the RFID tag 130 is returns the tag data stored therein from the not-shown internal antenna. If the CPU 210 receives the tag data returned in this way (YES in ACT 4), the CPU 210 causes the commodity-code reading unit 230 to read a commodity code and a password from the received tag data and causes the work memory to store the commodity code and the password (ACT 5).

Thereafter, the CPU 210 searches through the commodity table 260 using the commodity code stored in the work memory of the commodity-code reading unit 230 and acquires a password associated with the commodity code (ACT 6). Thereafter, the CPU 210 overwrites, referring to the area-password storing unit 240, the password of the RFID tag 130 in the backyard with the password of the RFID tag 130 in the storefront (ACT 7). Specifically, the CPU 210 updates the password '001' stored in the RFID tag 130 so far to '002'. The CPU 210 updates, in the same manner, the password associated with the commodity code of the commodity stored in the commodity table 260.

The CPU 210 executes the processing in ACTS 1 to 7 until no response is received from the RFID tag 130. If no response is received from the RFID tag 130 (NO in ACT 4), the CPU 210 ends the commodity delivery job.

In the above explanation, the commodity 120 is moved from the backyard to the storefront in the delivery job. In the opposite case, it is possible to cause the reader writer 200 according to this embodiment to operate in the same manner. Specifically, when a signal informing the start of the job for returning the commodity 120 from the storefront to the backyard is output from the trigger 250 and the CPU 210 receives the signal, the CPU 210 checks the area-password storing unit 240 and overwrites the password '002' of the RFID tag 130 attached to the commodity 120 with the password in the backyard, i.e., '001'. Further, the CPU 210 also updates the password associated with the commodity code of the commodity stored in the commodity table 260 in the same manner.

In the inventory job, an operator reads tag data from the RFID tag 130 attached to a commodity arranged in the backyard or the storefront holding the reader writer 200 in the hand or using another RFID reader. When the operator desires to know only the commodity arranged in the backyard, the operator causes the reader writer 200 or the RFID reader to discard tag data having a password for the storefront among the read tag data and treat tag data having a password for the backyard as valid data.

In this way, in the commodity managing system according to this embodiment, different passwords are set for the backyard and the storefront in the RFID tag 130 attached to the commodity 120. Therefore, in the inventory, the operator can count only the stock arranged in the backyard or the storefront using the reader writer 200 or another RFID reader. This makes it possible to prevent the operator from counting by mistake the commodities 120 arranged in the storefront when the operator desires to know only commodities arranged in the backyard or counting by mistake the commodities 120 arranged in the backyard when the operator desires to know only commodities arranged in the storefront. Moreover, it is possible to obtain these effects without using master information.

Second Embodiment

A second embodiment is explained with reference to FIGS. 7 to 10. A commodity managing system according to this embodiment is configured to efficiently perform, in the system explained in the first embodiment, stock management during inventory by, for example, allocating a password for each of commodity shelves arranged in a storefront.

Figure 7:
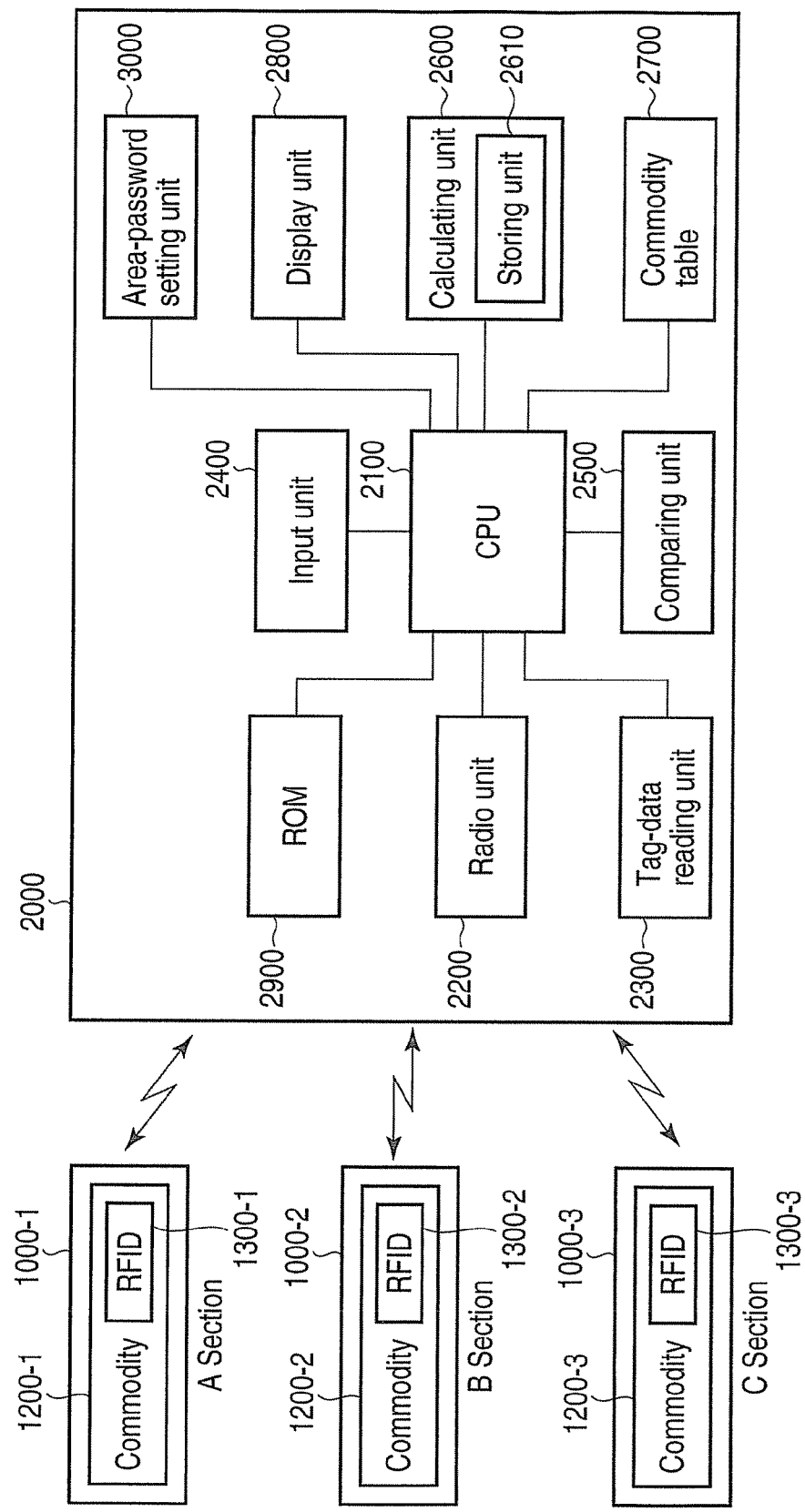
FIG. 7 is a conceptual diagram of a commodity managing system according to a second embodiment.

First, the commodity managing system according to this embodiment is explained with reference to FIG. 7. A diagram of the commodity managing system according to this embodiment is shown in FIG. 7. This system manages, with a product managing apparatus having a radio function, the stock of commodities 1200-1, 1200-2, and 1200-3 respectively stored on commodity shelves 1000-1, 1000-2, and 1000-3 respectively arranged in plural sections (in the figure, an A section, a B section, and a C section). In this embodiment, a reader writer 2000 is used as an example of the product managing apparatus. The commodity shelves 1000-1 to 1000-3 are arranged in a backyard. The reader writer 2000 in this embodiment is a handy terminal that a store clerk or the like in a selling floor holds in performing inventory.

Commodity shelf RFID tags 1300-1 to 1300-3 are respectively attached to the commodities 1200-1 to 1200-3 stored on the commodity shelves 1000-1 to 1000-3. The stock on the commodity shelves 1000-1 to 1000-3 is managed by reading data of the RFID tags 1300-1 to 1300-3 with the reader writer 2000 by radio communication.

As in the first embodiment, each of the RFID tags 1300-1 to 1300-3 includes an internal antenna and an IC chip not shown in the figure. Identification code peculiar to each of the commodities 1200-1 to 1200-3 (hereinafter referred to as commodity code) and a peculiar password allocated to each of the sections are written in the RFID tag. Specifically, a password stored in the RFID tag 1300-1 of the commodity 1200-1 arranged on the commodity shelf 1000-1 in the A section and, for example, a password stored in the RFID tag 1300-2 of the commodity 1200-2 arranged on the commodity shelf 1000-2 in the B section are different from each other. Similarly, a password stored in the RFID tag 1300-3 of the commodity 1200-3 arranged on the commodity shelf 1000-3 in the C section is different from the passwords stored in the RFID tags 1300-1 and 1300-2 of the commodities 1200-1 and 1200-2 arranged in the A section and the B section.

In the following explanation, when the RFID tags 1300-1 to 1300-3 are not distinguished from one another, the RFID tags 1300-1 to 1300-3 are simply referred to as RFID tags 1300. Similarly, when the commodity shelves 1000-1 to 1000-3 are not distinguished from one another, the commodity shelves 1000-1 to 1000-3 are simply referred to as commodity shelves 1000. Further, when the commodities 1200-1 to 1200-3 are not distinguished from one another, the commodities 1200-1 to 1200-3 are simply referred to as commodities 1200.

Reader Writer 2000

Referring back to FIG. 7, the reader writer 2000 is explained. As shown in FIG. 7, the reader writer 2000 includes a CPU 2100 configured to centrally control units explained below, a radio unit 2200, a tag-data reading unit 2300, an input unit 2400, a comparing unit 2500, a calculating unit 2600 (the counting unit), a commodity table 2700, a display unit 2800, a ROM 2900, and a password setting unit 3000. A control circuit is formed by connecting, with a bus line, the CPU 2100, the radio unit 2200, the tag-data reading unit 2300, the input unit 2400, the comparing unit 2500, the calculating unit 2600, the commodity table 2700, the display unit 2800, the password setting unit 3000, and the ROM 2900 configured to store fixed data such as a computer program for controlling the CPU 2100.

The input unit 2400 receives the input of a password to be allocated to each of the sections. Specifically, character keys of numbers 0 to 9, alphabets a to z, or the like used for the password are provided on the input unit 2400. The input unit 2400 captures, as the password, a character string input by the operation of these keys. During a commodity delivery job, the input unit 2400 receives the input of predetermined passwords to be stored in the RFID tags 1300 attached to the commodities 1200 arranged on specific commodity shelves 1000. During an inventory job, the input unit 2400 receives the input of the password allocated to each of the sections.

The comparing unit 2500 compares the password received by the input unit 2400 and passwords of the RFID tags 1300 read by the tag-data reading unit 2300.

The calculating unit 2600 calculates a quantity of stock by commodity on the basis of a commodity code of the RFID tag 1300 determined as including the password coinciding with the password received by the input unit 2400 as a result of the comparison by the comparing unit 2500. The calculated quantity of stock by commodity is stored in the storing unit 2610 together with a commodity name.

The commodity table 2700 stores commodity data such as commodity names in association with commodity codes of commodities displayed on the commodity shelves 1000. The commodity table 2700 stores the commodity data shown in FIG. 5.

Figure 8:
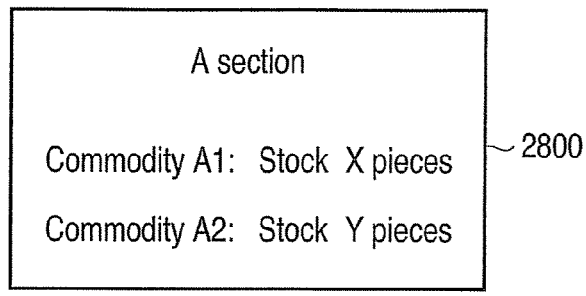
FIG. 8 is a diagram of an example of an inventory processing screen displayed on a display unit of a reader writer in the commodity managing system.

The display unit 2800 displays a stock management screen from data stored in the storing unit 2610. An example of the stock management screen is shown in FIG. 8. In FIG. 8, quantities of stock X and Y of commodities A1 and A2 arranged on the commodity shelf 1000-1 in the A section are shown.

When the password setting unit 3000 receives a signal indicating that a button provided on the input unit 2400 for informing a job for arranging the commodities 1200 on the commodity shelves 1000 is pressed, a password setting unit 3000 sets the password received by the input unit 2400 as a password peculiar to each of the commodity shelves 1000. Specifically, the password setting unit 3000 sets, for example, a password 'a' for the RFID tag 1300-1 attached to the commodity 1200-1 arranged on the commodity shelf 1000-1 in the A section. Similarly, the password setting unit 3000 sets, for example, a password 'b' for the RFID tag 1300-2 attached to the commodity 1200-2 arranged on the commodity shelf 1000-2 in the B section. The password setting unit 3000 sets, for example, a password 'c' for the RFID tag 1300-3 attached to the commodity 1200-3 arranged on the commodity shelf 1000-3 in the C section.

The radio unit 2200 and the tag-data reading unit 2300 having constitutions other than the above are not explained because they have functions same as those of the radio unit 200 and the tag-data reading unit 230 in the first embodiment.

Writing Operation by the Reader Writer 2000

Figure 9:
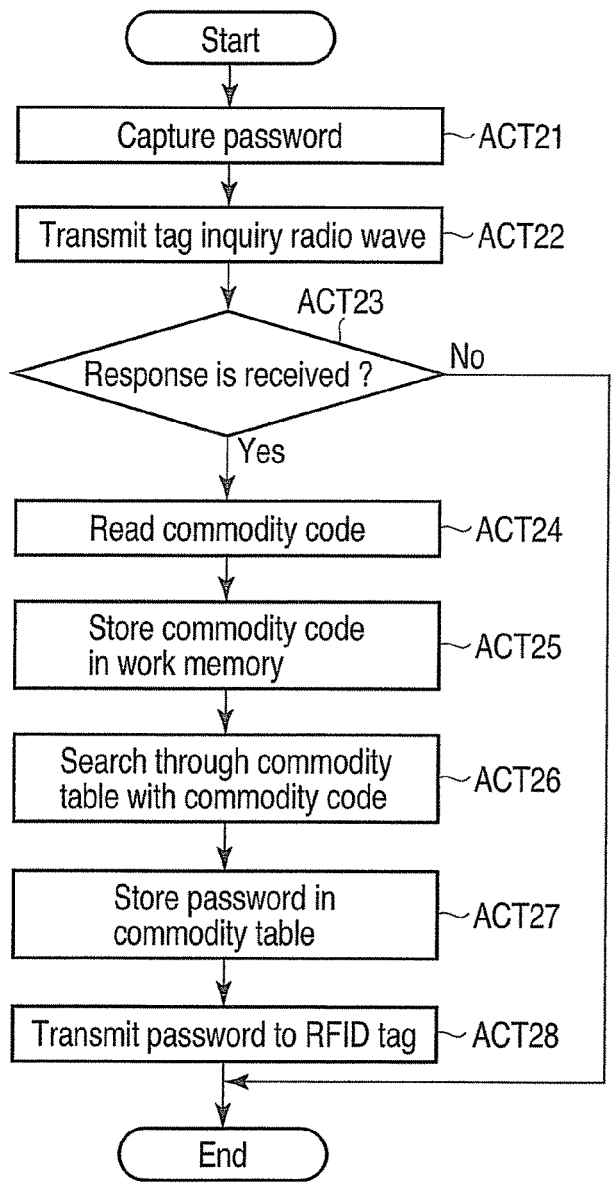
FIG. 9 is a flowchart for explaining a procedure of inventory processing executed by a CPU of the reader writer in the commodity managing system.

When arrangement of commodities on commodity shelves is instructed via the input unit 2400, the CPU 2100 executes password writing processing shown in a flowchart of FIG. 9. This processing is realized by the control program stored in the ROM 2900. As an example, it is assumed that a commodity delivery job for delivering the commodity 1200-1 arranged on the commodity shelf 1000-1 in the A section to the commodity shelves 1000 is executed. In this commodity delivery job, a password is written in the RFID tag 1300-1.

First, the CPU 2100 waits for a password, which is allocated to each of the sections, to be input to the input unit 2400. When character string data of numbers, alphabets, or the like is input by the operation of the character keys of the input unit 2400, the CPU 2100 captures the character string data as a password (ACT 21). When the password is captured, the CPU 2100 causes the radio unit 2200 to operate and radiate a radio wave for tag inquiry (ACT 22).

Figure 10:
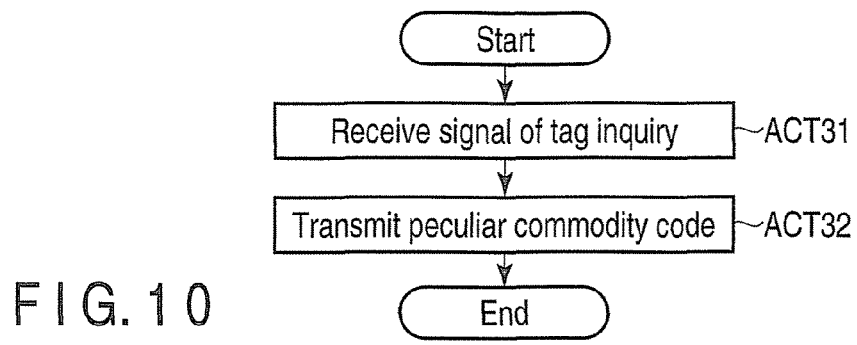
FIG. 10 is a flowchart for explaining a procedure executed when an RFID tag in the commodity managing system receives an inquiry radio wave.

The RFID tag 1300-1 being present in a reaching area of the radio wave for tag inquiry performs operation shown in a flowchart of FIG. 10. Specifically, when the RFID tag 1300-1 receives the radio wave for tag inquiry (ACT 31), the RFID tag 1300-1 is activated and returns a commodity code stored in a memory thereof to the reader writer 2000 as tag data (ACT 32).

If the CPU 2100 receives the tag data returned from the RFID tag 1300-1 in this way (YES in ACT 23), the CPU 2100 supplies the tag data to the tag-data reading unit 2300 and causes the tag-data reading unit 2300 to read the commodity code (ACT 24). The CPU 2100 causes a work memory to store the read commodity code (ACT 25).

Subsequently, the CPU 2100 searches through the commodity table 2700 with the commodity code stored in the work memory (ACT 26). The CPU 2100 updates a password corresponding to the commodity code found in the commodity table 2700 with the password input in ACT 21 (ACT 27).

Thereafter, the CPU 2100 transmits a password allocated to each of the sections and written in the commodity table 2700 to the RFID tag 1300-1 corresponding to the commodity shelf 1000-1 via the radio unit 2200 to write a predetermined password in the RFID tag 1300-1 (ACT 28). The CPU 2100 performs the processing in ACTS 21 to 28 for each of the sections. If there is no response from the tag reader 1300-1 in ACT 23 (NO in ACT 23), the CPU 2100 ends the writing of a password.

Readout Operation by the Reader Writer 2000

Figure 11:
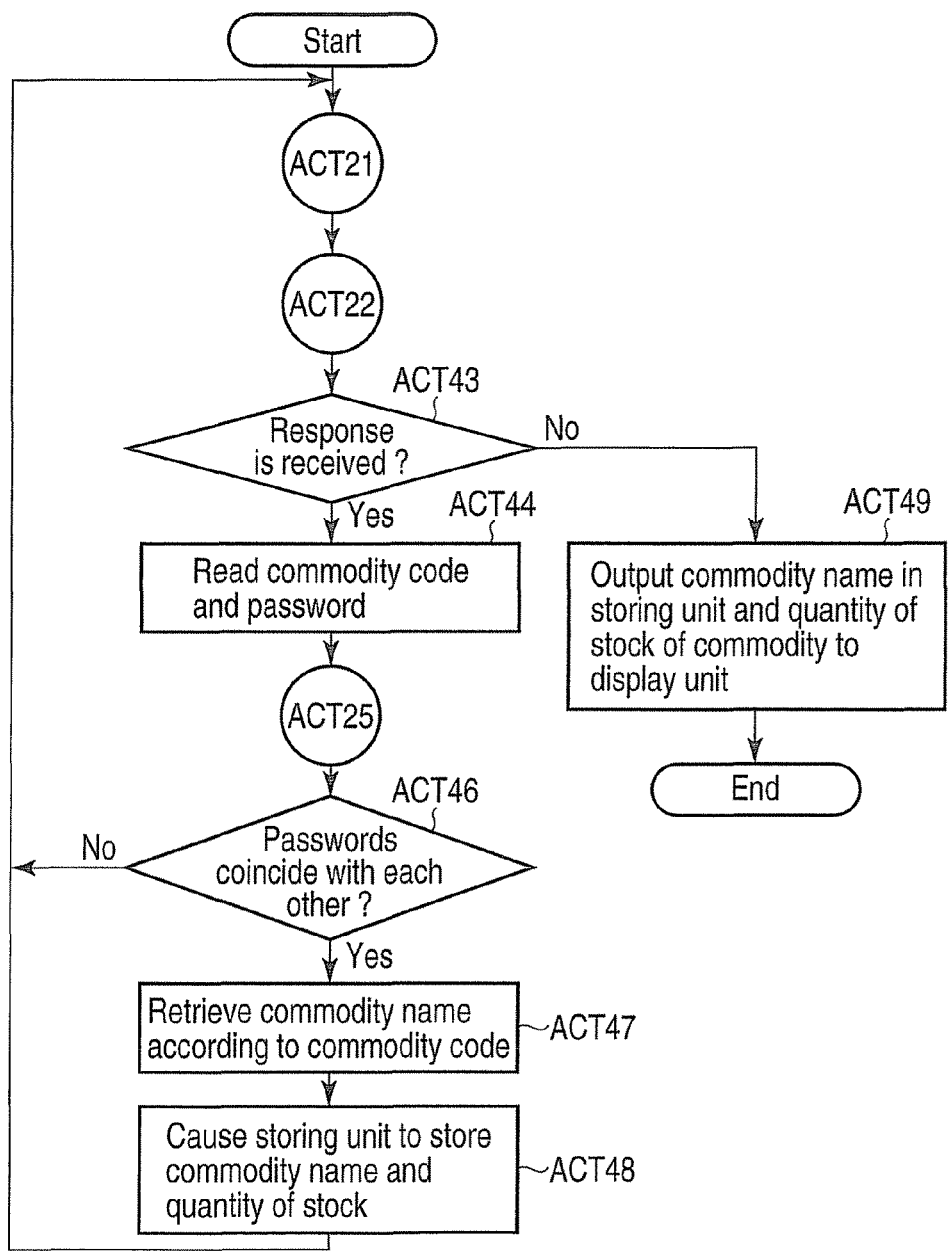
FIG. 11 is a flowchart for explaining a procedure of inventory processing executed by the CPU of the reader writer in the commodity managing system.

Readout operation by the CPU 2100 in the inventory job is explained. When the start of the inventory job is instructed via the input unit 2400, the CPU 2100 executes inventory processing shown in a flowchart of FIG. 11. This processing is realized by the control program stored in the ROM 2900. As an example, it is assumed that the CPU 2100 executes the inventory job on the commodity 1200-1 arranged on the commodity shelf 1000-1 in the A section.

First, the CPU 2100 performs processing same as that in ACTS 21 and 22 in the password writing operation. Specifically, the CPU 2100 waits for a password allocated to each of the sections to be input to the input unit 2400 by the execution of the processing shown in the flowchart of FIG. 9. When character string data of numbers, alphabets, or the like is input by the operation of the character keys of the input unit 2400, the CPU 2100 captures the character string data as a password. When the password is captured, the CPU 2100 causes the radio unit 2200 to operate and radiate a radio wave for tag inquiry.

Figure 12:
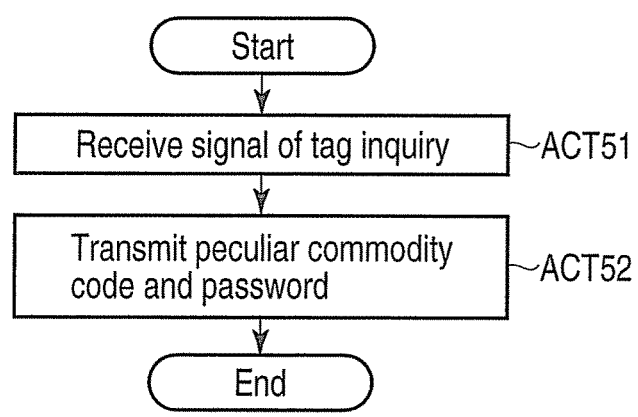
FIG. 12 is a flowchart for explaining a procedure executed when the RFID tag in the commodity managing system receives the inquiry radio wave.

The RFID tag 1300-1 being present in a reaching area of the radio wave for tag inquiry operates according to a flowchart of FIG. 12. Specifically, when the RFID tag 1300-1 receives the radio wave for tag inquiry (ACT 51), the RFID tag 1300-1 is activated and returns a commodity code and a password stored in the memory to the reader writer 2000 as tag data (ACT 52).

If the CPU 2100 receives the tag data returned from the RFID tag 1300-1 in this way (YES in ACT 43), the CPU 2100 supplies the tag data to the tag-data reading unit 2300 and causes the tag-data reading unit 2300 to read the commodity code and the password (ACT 44). The CPU 2100 performs processing same as that in ACT 25.

Subsequently, the CPU 2100 causes the comparing unit 2500 to compare the password read by the commodity-code reading unit 2300 and the password captured in ACT 21 to determine whether the passwords coincide with each other (ACT 46). As a result, if the passwords coincide with each other (YES in ACT 46), the CPU 2100 searches through the commodity table 2700 and acquires a commodity name associated with the commodity code of the tag data (ACT 47). The CPU 2100 causes the calculating unit 2600 to count a quantity of stock by commodity on the basis of the commodity code of the tag data. The CPU 2100 causes the storing unit 2610 to store the quantity of stock by commodity calculated by the calculating unit 2600 and a commodity name of the commodity (ACT 48). The CPU 2100 repeats the processing in ACTS 21 to 48. If no response is received from the RFID tag 1300-1 (NO in ACT 43), the CPU 2100 causes the display unit 2800 to display the commodity name and the quantity of stock stored in the storing unit 2610 (ACT 49). If the passwords do not coincide with each other in ACT 46 (NO in ACT 46), the CPU 2100 waits until a password is input again (ACT 21).

As explained above, according to this embodiment, the commodities 1200 respectively stored on the commodity shelves 1000 are attached with the RFID tags 1300 in which the passwords peculiar to the sections where the commodity shelves 1000 are arranged are stored together with the commodity codes peculiar to the commodities. In this state, a store clerk who performs the inventory job inputs, via the input unit 2400 of the reader writer 2000, a password for the A section where an inventory target commodity shelf, for example, the commodity shelf 1000-1 is arranged. Then, a tag inquiry radio wave is radiated from the reader writer 2000 by radio communication employing a UHF band. Data of the RFID tags 1300 that receive the radio wave is read by the reader writer 2000. However, tag data including passwords not coinciding with the input password is discarded. The reader writer 2000 treats only tag data including a password coinciding with the input password as valid data, counts a quantity of stock by commodity on the basis of a commodity code in the tag data, and causes the display unit 2800 to display the quantity of stock. Therefore, commodities counted as the quantity of stock by commodity are limited to commodities attached with the RFID tags 1300 that store the password coinciding with the input password as tag data. Therefore, the stock of commodities on other commodity shelves is not counted by mistake.

In this way, with the product managing apparatus and the control method therefor according to this embodiment, even if specific master information is not prepared in advance, it is possible to perform stock management for only commodities arranged on a specific shelf set as an inventory target. Therefore, it is possible to execute an efficient inventory job.

Modifications

In the examples explained in the embodiments, the control program for realizing the functions is stored in the apparatus in advance. However, the present invention is not limited to this. The same program may be downloaded from a network to the apparatus or the control program stored in a recording medium may be installed in the apparatus. The recording medium may be any recording medium such as a CD-ROM as long as the recording medium can store a computer program and is readable by the apparatus. A function of obtaining the control program by the installation or the download in this way may be realized in cooperation with an OS (Operating System) or the like in the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A product managing apparatus, comprising:
    an input receiving unit configured to receive input of a first password;
    a radio unit configured to perform radio communication with a first radio frequency identification (RFID) tag attached to a first product and storing an identification code of the product and a second password;
    a comparing unit configured to perform a comparison of the first password and the second password read out from the first RFID tag by the radio unit;
    a counting unit configured to count a quantity of products, wherein the first password and the second password for respective products of the quantity of products are determined to coincide with each other based on the comparison by the comparing unit; and
    a display unit configured to display the quantity counted by the counting unit.

2. The product managing apparatus according to claim 1, further comprising a password setting unit configured to write the first password received by the input receiving unit to the first RFID tag or a second RFID tag attached to a second product arranged on a product shelf of plural product shelves.

3. The product managing apparatus according to claim 2, further comprising a product table configured to store the identification code and a password associated with the identification code, wherein
    the password setting unit is further configured to write the first password received by the input receiving unit in the first RFID tag or the second RFID tag and rewrite a password associated with an identification code stored in the first RFID tag or the second RFID tag in the product table with the first password.

4. The product managing apparatus according to claim 1, further comprising a storing unit configured to store a value of the quantity counted by the counting unit.

5. The product managing apparatus according to claim 1, wherein
    the counting unit is further configured to count the quantity of the product for respective identification codes of a set of identification codes, and
    the display unit is further configured to display the quantity of the product for the respective identification codes counted by the counting unit.

6. The product managing apparatus according to claim 5, wherein the display unit is further configured to display the quantity of the product for the respective identification codes together with product names specified by the respective identification codes.

7. A control method for a product managing apparatus including a radio unit capable of performing radio communication with a radio frequency identification (RFID) tag attached to a product and that stores an identification code of the product and a second password, the method comprising:
    receiving input of a first password by an input receiving unit;
    causing the radio unit to read out the second password from the RFID tag;
    comparing the first password with the second password read out from the RFID tag by the radio unit;
    counting a quantity of products, wherein the first password and the second password for respective products of the quantity of products are determined to coincide with each based on the comparison; and
    causing a display unit to display the quantity of products.

* * * * *